(12) United States Patent
Mitsuhashi

(10) Patent No.: US 7,828,358 B2
(45) Date of Patent: Nov. 9, 2010

(54) STORABLE SEAT FOR VEHICLE

(75) Inventor: Atsutaka Mitsuhashi, Aichi-ken (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 175 days.

(21) Appl. No.: 12/244,303

(22) Filed: Oct. 2, 2008

(65) Prior Publication Data
US 2009/0243323 A1    Oct. 1, 2009

(30) Foreign Application Priority Data
Jan. 22, 2008  (JP) .............................. 2008-011399

(51) Int. Cl.
*B60N 2/30*  (2006.01)
(52) U.S. Cl. ..................... 296/69; 296/65.05
(58) Field of Classification Search .............. 296/65.01, 296/65.05, 65.11, 65.16, 69; 297/15
See application file for complete search history.

(56) References Cited
U.S. PATENT DOCUMENTS 6,106,046 A * 8/2000 Reichel .................... 296/65.09
6,293,603 B1 * 9/2001 Waku et al. ............... 296/65.09
7,273,243 B2 * 9/2007 Prugarewicz ............. 296/65.09

FOREIGN PATENT DOCUMENTS
JP    2004-276816 A    10/2004

OTHER PUBLICATIONS
English language Abstract of JP 2004-276816 A.
* cited by examiner

*Primary Examiner*—Patricia L Engle
(74) *Attorney, Agent, or Firm*—Greenblum & Bernstein, P.L.C.

(57) ABSTRACT

One aspect of the invention includes a seat movable in a front-rear direction between an in-use position and a stored position. The seat is moved in the front-rear direction via a link. The link is coupled pivotally in the front-rear direction. One end of the link is coupled to a coupling member fixed to the seat. The other end of the link is coupled to a coupling member fixed to the floor. The link and the respective coupling members are coupled to each other using an axial member. The insertion hole is formed in a shape that inhibits the axial member from undergoing positional displacement in the front-rear direction within the insertion hole when the seat is at the in-use position and allows the axial member to undergo positional displacement in the front-rear direction within the insertion hole as the seat is moved from the in-use position to the stored position.

3 Claims, 4 Drawing Sheets

STORABLE SEAT FOR VEHICLE

BACKGROUND OF THE INVENTION

1. Field of the Invention

The present invention relates to a storable seat for vehicle that is movable in a front-rear direction between an in-use position and a stored position.

2. Description of Related Art

A storable seat disclosed in JP 2004-276816A is configured in such a manner that the seat is movable in a front-rear direction between an in-use position and a stored position via a link mechanism provided between the seat and the floor. The link mechanism is formed of an intermediate link and a rear link. Although a detailed description is omitted in the cited reference, the upper ends of the both links are coupled to the inner frame of the seat. The lower ends of the both links are also coupled to a stopper piece fixed to the floor. The inner frame and the stopper piece serve as coupling members. Both links are coupled to the coupling members without rattling. In other words, the both links will never undergo positional displacement in a front-rear direction with respect to the coupling members. A spring is incorporated into at least one of the intermediate link and the rear link. The elastic force of the spring is proportional to the seat weight. The seat is thus pushed to the intermediate position between the in-use position and the stored position. This configuration facilitates a seat folding operation.

Respective members, such as the coupling members, each link, a striker to fix the seat, and a hook engaging with the striker, have errors in mounting location and dimension. Accordingly, the center of pivot of each link varies while the seat is moved between the in-use position and the stored position. In this case, a tensile load and a compressive load are applied on the respective coupling members and links. With the storable seat of JP 2004-276816A, however, each link is coupled to the corresponding coupling member without causing positional displacement at any time. This configuration raises problems as follows. That is, the seat position is not stabilized, the seat cannot be moved smoothly between the in-use position and the stored position, and the respective coupling members and links undergo deformation or break due to an undue load applied thereon.

Thus, there is a need in the art for a storable seat capable of absorbing a variance of the center of pivot of the link when the seat is moved between the in-use position and the stored position, and that further provides a stable locking capability at the in-use position and a pivotal trajectory.

BRIEF SUMMARY OF THE INVENTION

A storable seat for vehicle of the invention is movable in a front-rear direction between an in-use position and a stored position. The seat is moved in the front-rear direction via a link. The link is coupled pivotally in the front-rear direction. The in-use position is a position at which the seat is fixed on a floor for a passenger to be seated thereon. The stored position is a position at which the seat is stored in a concave portion formed in a part of the floor. The concave portion in which to store the seat may be provided in front of or behind the in-use position. At the stored position, the seat is stored in a folded state. One end of the link is coupled to a coupling member fixed to the seat. An inner frame of the seat and a member joined to the inner frame correspond to the coupling member to be fixed to the seat. The other end of the link is coupled to a coupling member fixed to the floor. Besides a coupling member manufactured apart from the one for the floor, the coupling member fixed to the floor includes a coupling member formed integrally with the floor. The link and the respective coupling members are coupled to each other using an axial member. The axial member is inserted into an insertion hole formed in at least one of the link and the respective coupling members. The insertion hole may be formed in both the link and the respective coupling members or formed only in one of the link and the coupling members. In a case where the insertion hole is formed in both the link and the coupling members, the axial member is a separate member from the link and the coupling members. In a case where the insertion hole is formed in either one of the link and the coupling members, the axial member can be formed integrally with the other member different from the member provided with the insertion hole.

The insertion hole formed in one of the coupling portion of the link and the seat and the coupling portion of the link and the floor is formed in a shape as follows. That is, the axial member is inhibited from undergoing positional displacement in the front-rear direction within the insertion hole when the seat is at the in-use position whereas the axial member is allowed to undergo positional displacement in the front-rear direction within the insertion hole as the seat is moved from the in-use position to the stored position. Accordingly, the link is allowed to undergo positional displacement in the front-rear direction with respect to the coupling member. When the seat is at the stored position, the coupling portion between the link and the coupling member has rattling.

According to the configuration above, it is possible to absorb a variance of the center of pivot of the link when the seat is moved to the stored position. Hence, in a case where the seat is moved between the in-use position and the stored position, there can be achieved advantages as follows. That is, an undue load will not be applied on the coupling members and the link. It is possible to prevent deformation or breaking of the coupling members and the link. Also, the seat can be moved smoothly between the in-use position and the stored position. Meanwhile, when the seat is at the in-use position, the axial member will not undergo positional displacement within the insertion hole. It thus becomes possible to fix the seat at the in-use position in a stable manner. The trajectory when the seat is returned from the in-use position to the stored position is stabilized, too. In addition, interference between the link and the floor can be also prevented.

The coupling portion where the axial member is allowed to undergo positional displacement within the insertion hole has a pivotal shaft and a guiding groove as the axial member to couple the link and the coupling member. The pivotal shaft serves as a center of pivot of the link. The guiding shaft is provided to a position spaced apart from the pivotal shaft by a specific amount. The position at which the guiding shaft is provided may be either on the outer side (end portion side) than the pivotal shaft or on the inner side (center side) than the pivotal shaft in the longitudinal direction of the link. The coupling member is provided with an axial hole and a guiding groove as the insertion hole. The pivotal shaft is inserted into the axial hole. The guiding shaft is inserted into the guiding groove. The axial hole is a long hole having a front-rear dimension larger than a diameter of the pivotal shaft. In other words, there is a space large enough to allow the pivotal shaft to undergo positional displacement in the front-rear direction within the axial hole. The guiding groove is formed in a shape conforming to a traveling trajectory of the guiding shaft. The guiding groove abuts on an outer surface of the guiding shaft in the front-rear direction when the seat is at the in-use position. Meanwhile, a width dimension thereof becomes larger than the diameter of the guiding groove as the seat is moved from the in-use position to the stored position. Accordingly, there is formed a space large enough to allow the guiding shaft to undergo positional displacement in the front-rear direction within the guiding groove as the seat is moved to the stored position.

According to this configuration, it is possible to switch a state to allow the positional displacement and a state to maintain the stability by the guiding shaft while the center of pivot of the link is regulated by the pivotal shaft. The center of pivot of the link is regulated within the axial hole, and the center of pivot will not vary considerably The pivotal shaft is allowed to undergo positional displacement within the axial hole at any time. Nevertheless, when the seat is at the in-use position, the guiding shaft abuts on the guiding groove. Hence, the guiding shaft and the pivotal shaft will not rattle at the in-use position and the seat is fixed in a stable manner. On the contrary, the pivotal shaft and the guiding shaft are allowed to undergo positional displacement as the seat is moved from the in-use position to the stored position. It thus becomes possible to absorb a dimensional error of the link or the like.

Another link is provided between the seat and the floor in addition to the link coupled in such a manner so as to undergo positional displacement. The another link is coupled to the coupling member fixed to the seat and to the coupling member fixed to the floor pivotally in the front-rear direction but in a state inhibited from undergoing positional displacement. The another link may be provided in front of or behind the link as long as it is allowed to undergo positional displacement. In other words, in a case where the seat is movable between the in-use position and the stored position by the link mechanism formed of a first link and a second link provided side by side in the front-rear direction between the seat and the floor, it is sufficient to couple either one of the first link and the second link to the coupling member so that the coupled link is allowed to undergo positional displacement. The another link is formed of an upper link member coupled to a seat side and a lower link member coupled to a floor side. In short, the another link is formed of two members. Each of the upper link member and the lower link member is provided with a fixing hole. The upper link member and the lower link member are fixed to each other using a fixing member inserted into both fixing holes while the fixing holes are superimposed each other. The upper link member and the lower link member are thus formed into a single link. At least one of the fixing hole in the upper link member and the fixing hole in the lower link member is shaped into a long hole having a length dimension in a link longitudinal direction larger than a diameter of the fixing member. The fixing hole of a long hole shape may be provided to both the upper link member and the lower link member, or either one of the upper link member and the lower link member. In a case where the fixing hole of a long hole shape is provided to either one of the upper link member and the lower link member, it is sufficient to form the other fixing hole in a right size for the fixing member to be inserted therein.

By providing the link allowed to undergo positional displacement and another link side by side, it becomes possible to move the seat between the in-use position and the stored position in a more stable manner. In this case, even when there is a relative dimensional error between the link allowed to undergo positional displacement and another link, because one link is allowed to undergo positional displacement, the dimensional error can be absorbed precisely. Hence, it becomes possible to prevent an undue load from being applied on the respective links or the like. In addition, by shaping the another link from two members and making at least one of the fixing holes in the upper and lower link members into a long hole, it becomes possible to adjust the fixing position of the fixing member within the fixing hole when the another link is assembled. It thus becomes possible to adjust the length of the another link at the time of assembly in response to an error in the mounting location of the coupling member.

By adopting the same mechanism as that of the another link for the link coupled so as to undergo positional displacement, the length of the link coupled so as to undergo positional displacement can be adjusted at the time of assembly in response to an error in the mounting location of the coupling member.

DETAILED DESCRIPTION OF THE INVENTION

Figure 2:
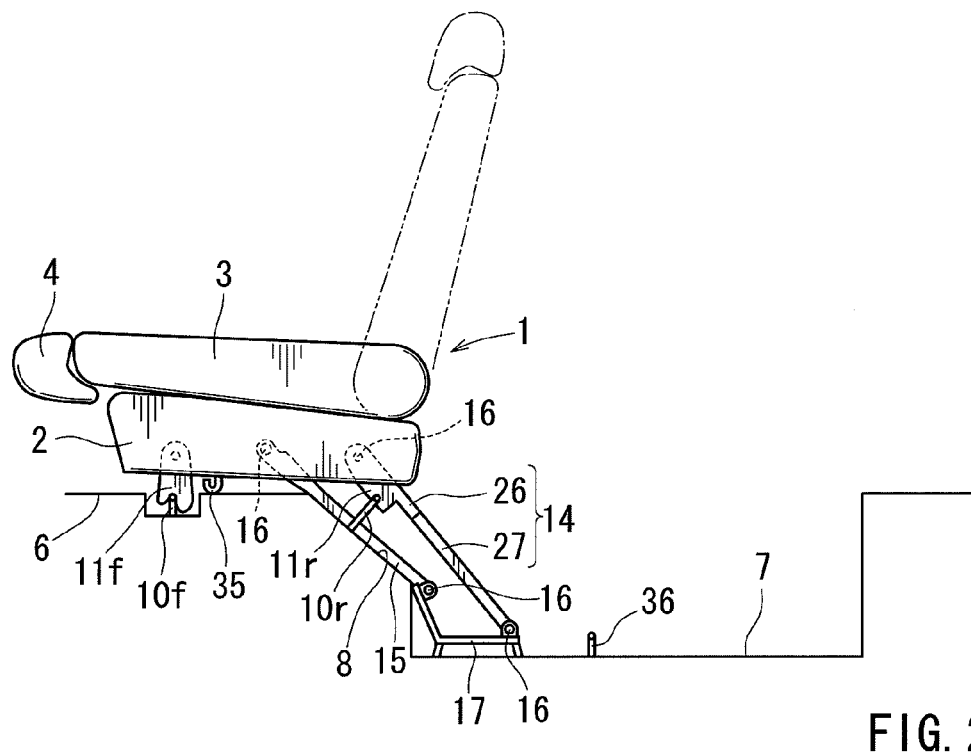
FIG. 2 is a side view when a storable seat is at the in-use position.
Figure 3:
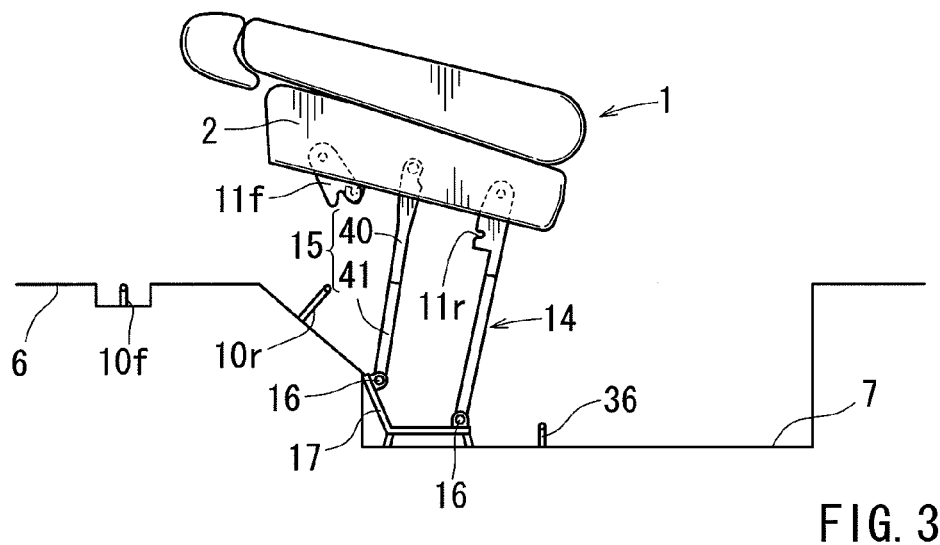
FIG. 3 is a side view when the storable seat is between the in-use position and the stored position.
Figure 4:
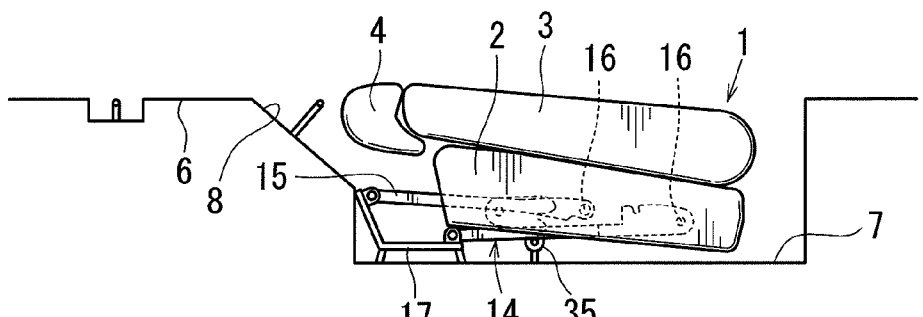
FIG. 4 is a side view when the storable seat is at the stored position.

As is shown in FIG. 2 through FIG. 4, a seat 1 has a seat cushion 2 serving as the seating portion for a passenger, a seat back 3 serving as the back rest, and a head rest 4 to support the head. The seat 1 is applicable as a rear seat for vehicle, such as an automobile. The seat back 3 is coupled to the seat cushion 2 via an unillustrated reclining mechanism. The seat back 3 is pivotally movable in a front-rear direction between an in-use posture uprising on the seat cushion 2 and a not-in-use posture folded forward over the seat cushion 2. The in-use posture of the seat cushion 2 is indicated by a virtual line in FIG. 2. The not-in-use posture of the seat cushion 2 is indicated by a solid line in FIG. 2. The seat 1 is movable in the front-rear direction between the in-use position shown in FIG. 2 and the stored position shown in FIG. 4. The in-use position is a position at which the seat 1 is fixed on a floor 6 for a passenger to be seated thereon. The stored position is a position at which the seat 1 is stored inside a concave portion 7 formed in a part of the floor 6. The concave portion 7 is formed behind the in-use position of the seat 1. At the stored position, the seat 1 is stored in a folded state. The seat 1 is moved via a link mechanism. The link mechanism is coupled to both the seat 1 and the floor 6 pivotally in the front-rear direction.

Figure 1:
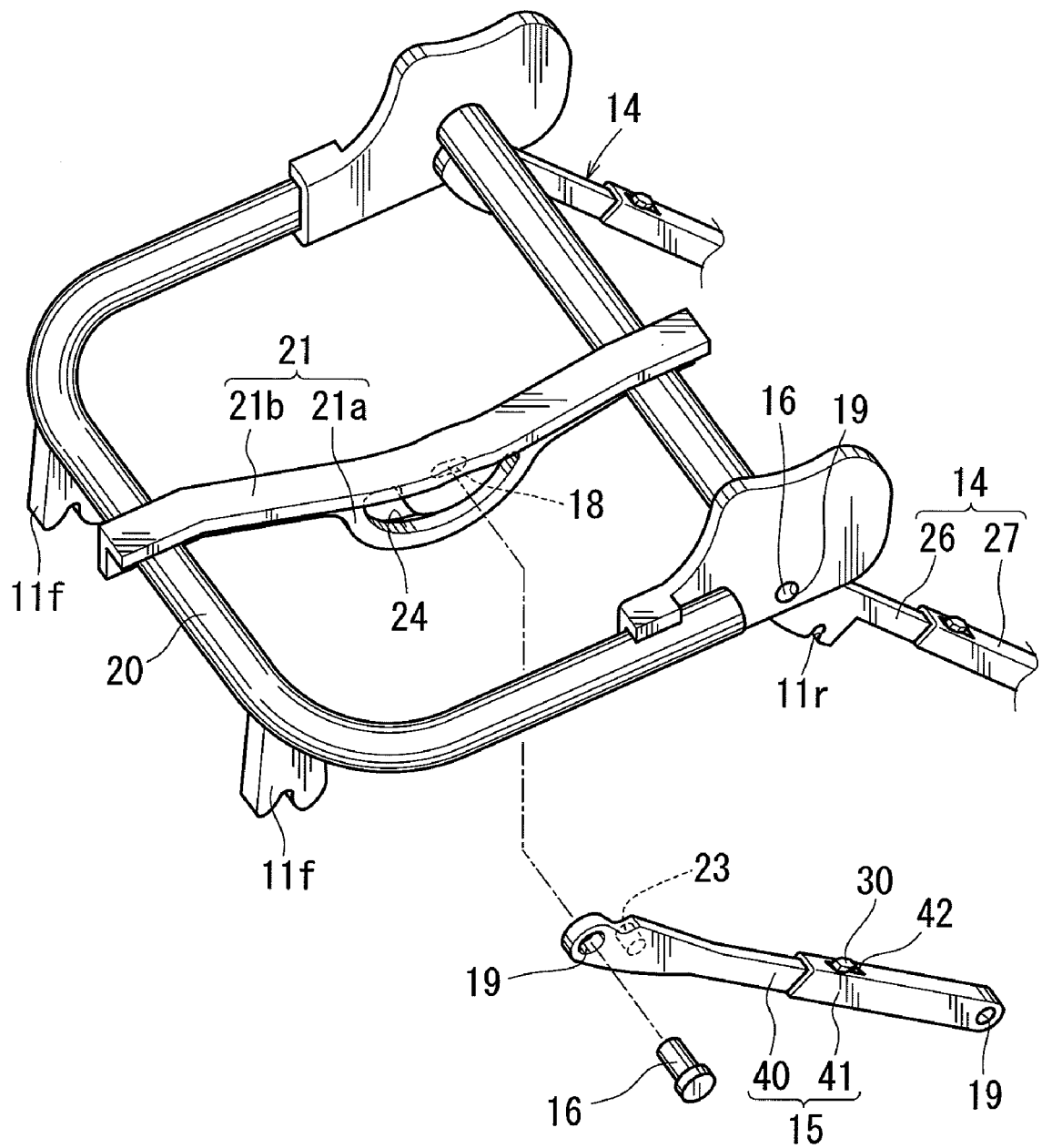
FIG. 1 is an exploded perspective view schematically showing the structure of an inner frame in a seat cushion.

At the in-use position, the seat 1 is locked on the floor 6 by locking means. The locking means is formed of a striker 10 provided on the floor 6 and a hook 11 that can be engaged with the striker 10. The hook 11 is provided to the lower surface of the seat cushion 2. A pair of the locking means on the left side and on the right side is provided to each of the front end and the rear end of the seat cushion 2. As are shown in FIG. 1 and FIG. 2, front hooks 11f are coupled to the lower surface front end portion of the seat cushion 2 on the right and left sides pivotally in the front-rear direction. Rear hooks 11*r* are coupled to the lower surface rear end portion of the seat cushion 2 on the right and left sides pivotally in the front-rear direction. The front hooks 11*f* and the rear hooks 11*r* have unillustrated locking mechanisms. The striker 10 is also formed of front strikers 10*f* and rear strikers 10*r*. The front strikers 10*f* are engaged with the both front hooks 11*f* on the right and left sides at the in-use position of the seat 1. The rear strikers 10*r* are engaged with the both rear hooks 11*r* on the right and left sides at the in-use position of the seat 1. The locking mechanism of the reclining mechanism and the locking mechanism of each hook 11 are interlocked. Accordingly, when the reclining mechanism is released from the locked state to fold the seat back 3 frontward to the not-in-use posture, the respective hooks 11 and the corresponding strikers 10 are released from the locked state, too. The rear hooks 11*r* are provided to rear links 14 described below.

As are shown in FIG. 1 and FIG. 2, the link mechanism is formed of rear links 14 and an intermediate link 15. The rear links 14 and the intermediate link 15 are provided side by side in the front-rear direction. The upper ends of the rear links 14 are coupled to the lower surface rear end portion of the seat cushion 2. The upper end of the intermediate link 15 is coupled to the lower surface front-rear intermediate portion of the seat cushion 2. The upper ends of the both links 14 and 15 are coupled to the inner frame provided inside the seat cushion 2 using axial pins 16. The upper ends of the both links 14 and 15 are coupled pivotally in the front-rear direction. The lower ends of the both links 14 and 15 are coupled to a coupling base 17 fixed to the bottom surface of the concave portion 7 using the axial pins 16. The lower ends of the both links 14 and 15 are coupled pivotally in the front-rear direction. The axial pins 16 are inserted into axial holes 18 and 19 provided to penetrate through the both links 14 and 15 and the inner frame as well as the coupling base 17. The axial pins 16 serve as the centers of pivot of the both links 14 and 15 and correspond to the pivotal shaft referred to in the invention.

The inner frame serving as a framework is constructed inside the seat cushion 2. The inner frame is made of metal. The inner frame of the seat cushion 2 has a rim frame 20 and a bridge 21. The rim frame 20 is shaped like an almost rectangular frame when viewed in a plane. The bridge 21 is provided to the rim frame 20 so as to bridge between the front and rear ends at the right-left center portion. The two rear links 14 are pivotally connected to the rear end of the rim frame 20 on both the right and left sides. The single intermediate link 15 is pivotally connected to the bridge 21 at the intermediate portion in the front-rear direction. The bridge 21 has a coupling plate portion 21*a* and a flange portion 21*b*. The coupling plate portion 21*a* is of a plate shape that is flat in the top-bottom direction. The intermediate link 15 is coupled to the coupling plate portion 21*a*. The flange portion 21*b* extends integrally with the coupling plate portion 21*a* in a horizontal direction from the upper end thereof. The flange portion 21*b* increases the strength of the bridge 21. The rim frame 20 corresponds to a seat-side coupling member for the rear links 14. The bridge 21 corresponds to a seat-side coupling member for the intermediate link 15. The coupling base 17 corresponds to a floor-side coupling member for the both links 14 and 15.

As is shown in FIG. 1, the intermediate link 15 is coupled to the bridge 21 using the axial pin 16 and a guiding shaft 23. The axial pin 16 serves as the center of pivot of the intermediate link 15. The guiding shaft 23 is provided at a position spaced apart from the axial pin 16 by a specific amount on the inner side in the longitudinal direction of the intermediate link 15 (the intermediate portion side). The guiding shaft 23 is formed integrally with the side surface of the intermediate link 15. The bridge 21 (the coupling plate portion 21*a* thereof) is provided with the axial hole 18 and a guiding groove 24. The axial pin 16 is inserted into the axial hole 18. The guiding shaft 23 is inserted into the guiding groove 24. The guiding groove 24 is formed in the shape of a circular arc along the pivotal trajectory of the guiding shaft 23.

Figure 5:
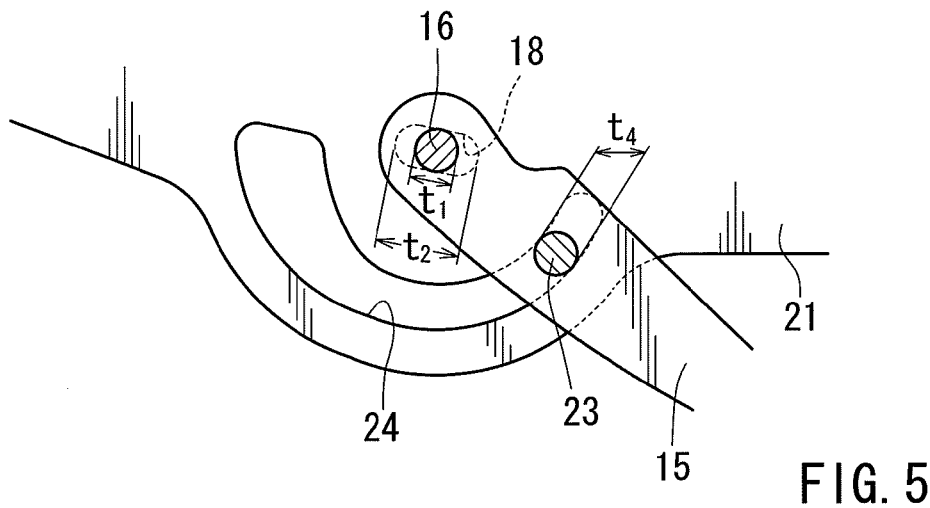
FIG. 5 is an enlarged view of a major portion showing a state of links when the storable seat is at the in-use position.
Figure 6:
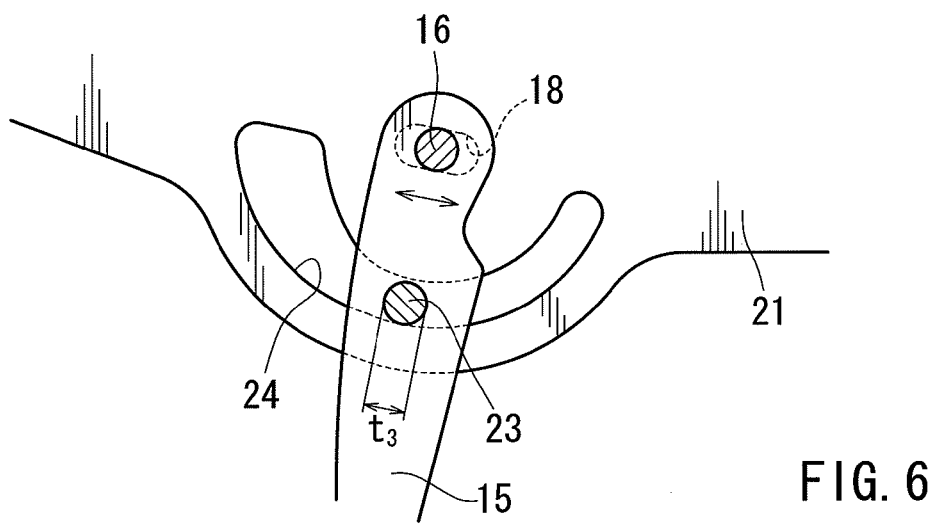
FIG. 6 is an enlarged view of a major portion showing a state of the links when the storable seat is between the in-use position and the stored position.
Figure 7:
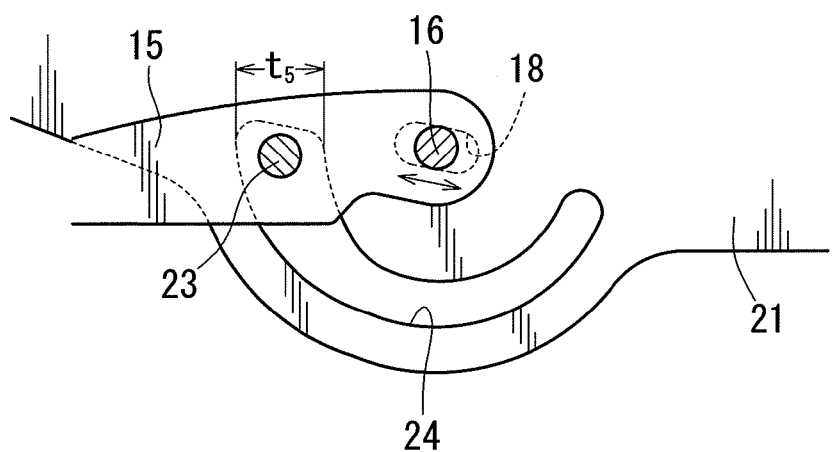
FIG. 7 is an enlarged view of a major portion showing a state of the links when the storable seat is at the stored position.

As are shown in FIG. 5 through FIG. 7, the top-bottom dimension of the axial hole 18 is equal to the diameter $t_1$ of the axial pin 16. On the contrary, the front-rear dimension $t_2$ of the axial hole 18 is larger than the diameter $t_1$ of the axial pin 16. In short, the axial hole 18 is a long hole. The guiding groove 24 abuts on the outer surface of the guiding shaft 23 in the front-rear direction when the seat 1 is at the in-use position (FIG. 5). Meanwhile, the width dimension of the guiding groove 24 becomes larger than the diameter of the guiding shaft 23 as the storable seat 1 is moved from the in-use position to the stored position (FIG. 6 and FIG. 7). This configuration allows the intermediate link 15 to undergo positional displacement in the front-rear direction with respect to the bridge 21 as the seat 1 is moved from the in-use position to the stored position. The axial holes 19 formed in the both links 14 and 15, the rim frame 20, and the coupling base 17 are of a circular shape, and the minor diameter thereof is equal to the diameter of the axial pin 16. The respective axial pins 16 are therefore inserted into the corresponding axial holes 19 without rattling. The rear links 14 corresponds to another link referred to in the invention.

Figure 8:
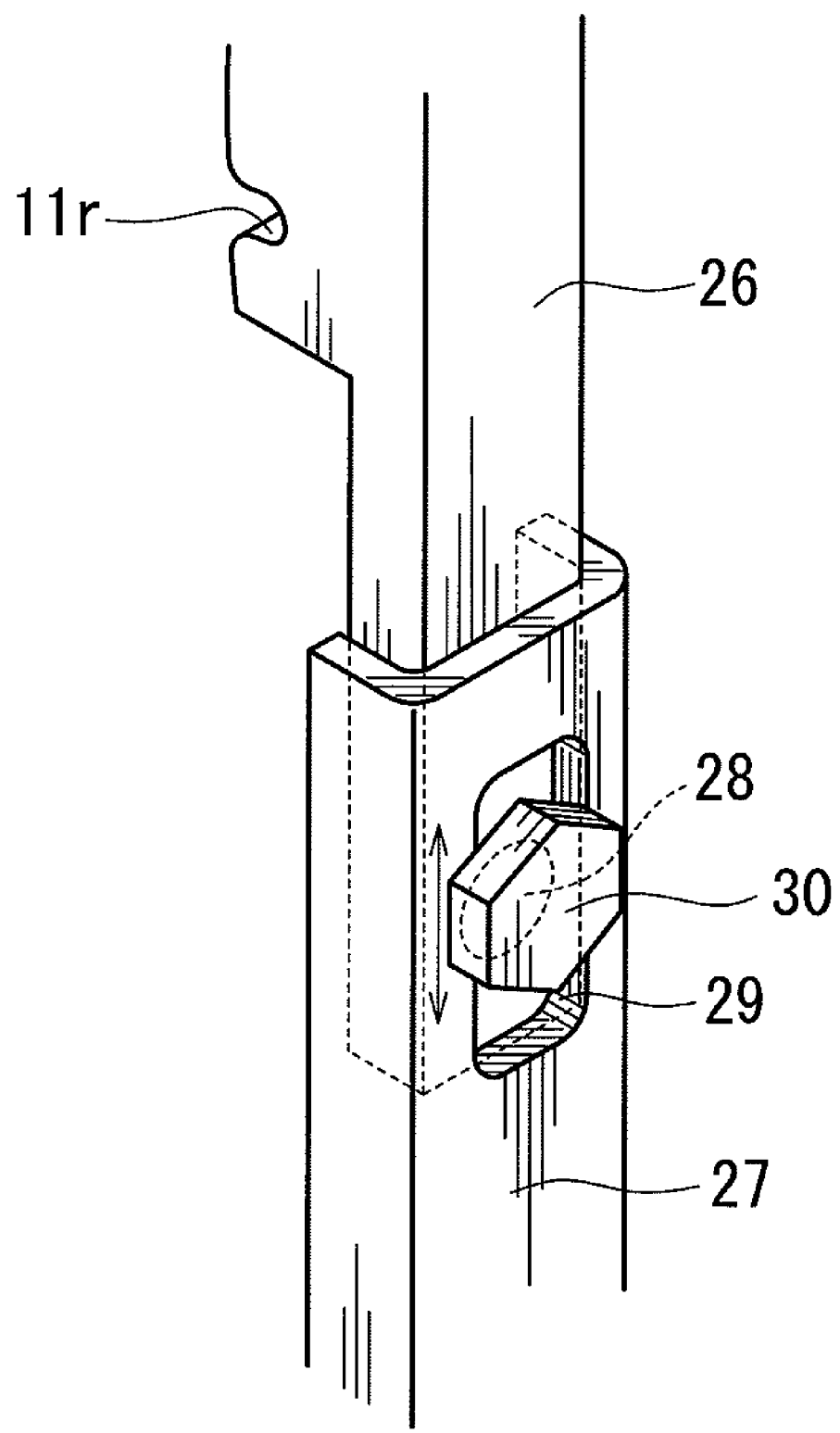
FIG. 8 is an enlarged view of a major portion of a rear link.

As is shown in FIG. 1 and FIG. 8, each rear link 14 is formed of two members: an upper link member 26 and a lower link member 27. The upper link member 26 is coupled to the rim frame 20 on the seat 1 side. The lower link member 27 is coupled to the coupling base 17 on the floor 6 side. The upper link member 26 is provided with a fixing hole 28. The lower link member 27 is provided with a fixing hole 29. The upper link member 26 and the lower link member 27 are fixed to each other by inserting a bolt 30 through both fixing holes 28 and 29 while the fixing hole 28 and the fixing hole 29 are superimposed each other. The upper link member 26 and the lower link member 27 thus form the single link 14. The bolt 30 corresponds to a fixing member. The lower link member 27 is formed in the shape of a rail. The upper link member 26, as shown, can be in the shape of a square rod. The upper link member 26 is accommodated in a state where it abuts on the inner surface of the lower link member 27. The fixing hole 28 in the upper link member 26 is of a circular shape. The diameter of the fixing hole 28 is equal to the diameter of the shaft portion of the bolt 30. The fixing hole 29 in the lower link member 27 is a hole that is longitudinally long from top to bottom. The right-left width dimension of the fixing hole 29 is equal to the diameter of the shaft portion of the bolt 30 and the diameter of the fixing hole 28. On the contrary, the top-bottom length of the fixing hole 29 is larger than the diameter of the shaft portion of the bolt 30 and the diameter of the fixing hole 28. The head portion of the bolt 30 is larger than the diameter of the fixing hole 28 and the right-left width dimension of the fixing hole 29.

As has been described, of the upper and lower link members 26 and 27, by shaping the fixing hole 29 in at least one link member 27 into a long hole, it becomes possible to address a dimensional error or the like of the rear link 14. In other words, when the rear link 14 is assembled, the upper end of the upper link member 26 is pivotally connected to the rim frame 20 first. At the same time, the lower end of the lower link member 27 is pivotally connected to the coupling base 17. Subsequently, the lower end portion of the upper link member 26 is applied to the inner surface of the upper end portion of the lower link member 27 and the bolt 30 is fixedly inserted into both fixing holes 28 and 29 in the link members 26 and 27, respectively. In this instance, the fixing hole 28 and the fixing hole 29 may possibly undergo positional displacement due to an error of the mounting location and a dimensional error of the coupling base 17. Nevertheless, because the fixing hole 29 is formed to be longitudinally long from top to bottom, such a positional displacement can be addressed. It thus becomes possible to prevent an undue load from being applied on the rear links 14 because of an error in a relative positional relation between the seat 1 and the coupling base 17.

As is shown in FIG. 1, the intermediate link 15 has the same structure as that of the rear links 14. The intermediate link 15 is formed of an upper link member 40 coupled to the seat 1 side and a lower link member 41 coupled to the floor 6 side. The upper link member 40 is in the shape of a square rod. The lower link member 41 is in the shape of a rail. A fixing hole 42 in the lower link member 41 is a long hole larger than the diameter of the shaft portion of the bolt 30. It is therefore possible to address a dimensional error or the like in the intermediate link 15. The intermediate link 15 is assembled in the same manner as the rear link 14. In this instance, even there is an error in the mounting location or in the dimension of the coupling base 17, because the fixing hole 42 is a long hole, it is possible to adjust the length of the intermediate link 15 while adjusting the fixing position of the bolt 30. Accordingly, it becomes possible to avoid an undue load from being applied on the intermediate link 15 due to an error of a relative positional relation between the seat 1 and the coupling base 17.

A function when the seat 1 is moved between the in-use position and the stored position will be described. As is shown in FIG. 2, while the seat 1 takes the in-use posture at the in-use position, the respective hooks 11 of the seat 1 are engaged with the corresponding strikers 10 on the floor 6. The seat 1 is thus fixed at the in-use position. In this instance, as is shown in FIG. 5, the axial pin 16 is allowed to undergo positional displacement in the front-rear direction within the axial hole 18 at any time. Nevertheless, the guiding shaft 23 abuts on the guiding groove 24. The width dimension $t_4$ of the guiding groove 24 at the in-use position side is equal to the diameter $t_3$ of the guiding shaft 23 (see FIG. 6). Accordingly, the intermediate link 15 will not undergo positional displacement in the front-rear direction with respect to the bridge 21 and the seat 1 is fixed in a stable manner at the in-use position. It should be noted that the diameter $t_1$ of the axial pin 16 and the diameter $t_3$ of the guiding shaft 23 may be equal to or different from each other as long as the relations, $t_1 < t_2$ and $t_3 = t_4$ (to be more exact, $t_3 \approx t_4$), are maintained.

The boundary portion of the floor 6 and the front side wall of the concave portion 7 form an inclined surface 8. It is designed in such a manner that the intermediate link 15 will not come into contact with the inclined surface 8 while the seat 1 is fixed at the in-use position. The seat back 3 in an in-use state is folded frontward over the seat cushion 2 by operating an unillustrated lever. This state is the not-in-use posture. The lever is provided to the side surface or the like of the seat cushion 2. When the seat back 3 is brought into the not-in-use posture, the respective hooks 11 are released from the locked state. The respective hooks 11 therefore become removable from the corresponding strikers 10. Subsequently, the respective hooks 11 are removed from the corresponding strikers 10, and as is shown in FIG. 3, the seat 1 is moved to the rear end side of the vehicle via the rear links 14 and the intermediate link 15. In association with this movement, the front hooks 11f on the right and left sides turn backward so as to be stored into the seat cushion 2. In this instance, as is shown in FIG. 6, as the guiding shaft 23 travels to the intermediate portion of the guiding groove 24, the axial pin 16 and the guiding shaft 23 are allowed to undergo positional displacement in the front-rear direction within the axial hole 18 and the guiding groove 24, respectively.

By moving the seat 1 rearward further from the position in FIG. 3, the seat 1 is stored inside the concave portion 7 as is shown in FIG. 4. At the stored position, a storing hook 35 provided to the lower surface right-left intermediate portion of the seat cushion 2 engages with a striker 36 provided to the bottom surface of the concave portion 7. The seat 1 is thus held inside the concave portion 7. The front hooks 11f and 11f on the right and left sides are positioned on the inner side of the rear hooks 11r and 11r on the right and left sides. As is shown in FIG. 7, the guiding shaft 23 travels to the stored position side of the guiding groove 24. In this instance, the width dimension $t_5$ of the guiding groove 24 on the stored position side is larger than the diameter $t_3$ of the guiding shaft 23. The guiding shaft 23 is thus allowed to undergo positional displacement in the front-rear direction within the guiding groove 24 at the stored position, too. Accordingly, the intermediate link 15 is allowed to undergo positional displacement in the front-rear direction with respect to the bridge 21 in association with the movement of the seat 1 from the in-use position to the stored position.

The lengths of the rear links 14 and the intermediate link 15 are adjusted in reference to the in-use position at the time of assembly. However, the lengths in reference to the in-use position do not necessarily coincide with lengths needed at the stored position. In other words, the lengths of the links 14 and 15 needed at the in-use position and the lengths of the links 14 and 15 needed at the stored position may possibly differ because of various dimensional errors and errors in the mounting location. Errors in the rear links 14 and the intermediate link 15 may possibly be different between the rear links 14 and the intermediate link 15. Accordingly, the center of pivot of the intermediate link 15 may possibly be shifted relatively with respect to the center of pivot of the rear links 14 in association with the movement of the seat 1 to the stored position. To overcome this inconvenience, even when there is a variance between the center of pivot of the rear links 14 and that of the intermediate link 15 due to a mounting error of the striker 36 and the coupling base 17 inside the concave portion 7, a dimensional error between the rear links 14 and the intermediate link 15, and so forth, by allowing the intermediate link 15 to undergo positional displacement in association with the movement of the seat 1 to the stored position, the intermediate link 15 is allowed to move in the front-rear direction so as to absorb such a variance. It is sufficient that the width dimension $t_5$ of the guiding groove 24 on the stored position side is equal to or larger than the front-rear dimension $t_2$ of the axial hole 18 ($t_2 \leq t_5$). Preferably, $t_2 = t_5$.

In a case where the seat 1 is moved from the stored position to the in-use position, an operation inverse to the operation as described above is performed. In this instance, the width dimension of the guiding groove 24 becomes smaller as the guiding shaft 23 travels within the guiding groove 24 to the in-use position side. Eventually, the width dimension $t_4$ of the guiding groove 24 and the diameter $t_3$ of the guiding shaft 23 become equal to each other, which can stabilize the pivotal trajectory of the guiding shaft 23 to the in-use position side. Accordingly, when the seat 1 is moved from the stored position to the in-use position, it is possible to prevent the intermediate link 15 from interfering with the inclined surface 8 of the floor 6.

While the best mode of the invention has been described, it should be appreciated that the invention can be modified in various manners. For example, the portion to which the guiding groove 24 and the guiding shaft 23 are provided (that is, the coupling portion allowed to undergo positional displacement), is not limited to the coupling portion of the intermediate link 15 and the bridge 21. In other words, this portion can be provided to a coupling portion of the intermediate link 15 and the coupling base 17, a coupling portion of the rear links 14 and the rim frame 20, or a coupling portion of the rear links 14 and the coupling base 17. The coupling portion allowed to undergo positional displacement may be any one or more than one of the both ends of the rear links 14 and the both ends of the intermediate link 15. In other words, in a case where a first link and a second link are provided side by side in the front-rear direction via the coupling member between the seat 1 and the floor 6, it is sufficient that the link is allowed to undergo positional displacement in the front-rear direction with respect to the coupling member at least at one of the seat-side coupling portion of the first link, the floor-side coupling portion of the first link, the seat-side coupling portion of the second link, and the floor-side coupling portion of the second link. In a case where the rear links 14 are allowed to undergo positional displacement and the intermediate link 15 is coupled without rattling (in a state inhibited from undergoing positional displacement), the intermediate link 15 corresponds to another link referred to in the invention.

Of the both links 14 and 15, the link to be coupled so as to undergo positional displacement is not necessarily formed of two members each of which is adjustable in length. The guiding groove 23 may be provided to the outer side than the axial pin 16. The same can be said about the relation between the guiding groove 24 and the axial hole 18. In this case, the guiding groove 24 is of a circular arc shape whose intermediate portion bends upward. Herein, the width dimension $t_5$ on the front side of the vehicle, which is the in-use position side, is made equal to the diameter $t_3$ of the guiding shaft 23, while the width dimension $t_4$ on the rear side of the vehicle, which is the stored position side, is made larger than the diameter $t_3$ of the guiding shaft 23 ($t_3 > t_4$).

The axial hole 19 in the intermediate link 15 may be shaped into a long hole instead of the axial hole 18. In this case, the axial hole 18 is made to be equal to the diameter of the axial pin 16. Besides the configuration to form the guiding shaft 23 integrally with the intermediate link 15, it may be configured in such a manner that an insertion hole is also provided to the intermediate link 15, so that the guiding shaft 23 provided as a separate member is inserted into this insertion hole. Two bridges 21 may be provided on the right and left sides, so that two intermediate links 15 can be provided on the right and left sides as well. The fixing hole 28 in the upper link member 26 may be made longitudinally long from top-to bottom while making the fixing hole 29 in the lower link member 27 into a circular shape. Two coupling bases may be used as the coupling base 17: one for the rear links 14 and the other for the intermediate link 15.

What is claimed is:

1. A storable seat for a vehicle comprising:
an in-use position and a stored position that is movable in a front-rear direction via a link coupled pivotally in the front-rear direction, wherein
the in-use position is a position at which a seat is fixed on a floor for a passenger to be seated thereon, and
the stored position is a position at which the seat is stored in a concave portion formed in a part of the floor, wherein
the seat is folded and stored at the stored position, wherein
one end of the link is coupled to a coupling member fixed to the seat and the other end of the link is coupled to a coupling member fixed to the floor, wherein
the link and the respective coupling members are coupled to each other with an axial member inserted into an insertion hole formed in at least one of the link and the respective coupling members, wherein
the insertion hole is formed in at least one of a coupling portion of the link and the seat and a coupling portion of the link and the floor, and is formed in a shape that inhibits the axial member from undergoing positional displacement in the front-rear direction within the insertion hole when the seat is at the in-use position and allows the axial member to undergo positional displacement in the front-rear direction within the insertion hole as the seat is moved from the in-use position to the stored position, wherein
the coupling portion, where the axial member is allowed to undergo positional displacement within the insertion hole, has a pivotal shaft and a guiding groove as the axial member to couple the link and the coupling member, wherein
the pivotal shaft is a center of pivot of the link, wherein
a guiding shaft is positioned apart from the pivotal shaft, wherein
the coupling member is provided with an axial hole in which the pivotal shaft is inserted and the guiding groove in which the guiding shaft is inserted as the insertion hole, wherein
the axial hole is a long hole whose front-rear dimension is larger than a diameter of the pivotal shaft, and wherein
the guiding groove is formed in a shape conforming to a traveling trajectory of the guiding shaft and abuts on an outer surface of the guiding shaft in the front-rear direction when the seat is at the in-use position and a width dimension thereof becomes larger than the diameter of the guiding shaft as the seat is moved from the in-use position to the stored position.

2. A storable seat for a vehicle comprising:
an in-use position and a stored position that is movable in a front-rear direction via a link coupled pivotally in the front-rear direction, wherein
the in-use position is a position at which a seat is fixed on a floor for a passenger to be seated thereon, and
the stored position is a position at which the seat is stored in a concave portion formed in a part of the floor, wherein
the seat is folded and stored at the stored position, wherein
one end of the link is coupled to a coupling member fixed to the seat and the other end of the link is coupled to a coupling member fixed to the floor, wherein
the link and the respective coupling members are coupled to each other with an axial member inserted into an insertion hole formed in at least one of the link and the respective coupling members, wherein
the insertion hole is formed in at least one of a coupling portion of the link and the seat and a coupling portion of the link and the floor, and is formed in a shape that inhibits the axial member from undergoing positional displacement in the front-rear direction within the insertion hole when the seat is at the in-use position and allows the axial member to undergo positional displacement in the front-rear direction within the insertion hole as the seat is moved from the in-use position to the stored position, and wherein another link is provided between the seat and the floor in addition to the link coupled in such a manner so as to undergo positional displacement;

the another link is coupled to the coupling member fixed to the seat and to the coupling member fixed to the floor pivotally in the front-rear direction and in a state inhibited from undergoing positional displacement;

the another link is formed of an upper link member coupled to a seat side and a lower link member coupled to a floor side;

each of the upper link member and the lower link member is provided with a fixing hole;

the upper link member and the lower link member are fixed to each other using a fixing member inserted into both fixing holes while the fixing holes superimpose each other; and at least one of the fixing hole in the upper link member and the fixing hole in the lower link member is shaped into a long hole having a length dimension in a link longitudinal direction larger than a diameter of the fixing member.

3. A storable seat for a vehicle comprising:

an in-use position and a stored position that is movable in a front-rear direction via a link coupled pivotally in the front-rear direction, wherein the in-use position is a position at which a seat is fixed on a floor for a passenger to be seated thereon, and the stored position is a position at which the seat is stored in a concave portion formed in a part of the floor, wherein the seat is folded and stored at the stored position, wherein one end of the link is coupled to a coupling member fixed to the seat and the other end of the link is coupled to a coupling member fixed to the floor, wherein the link and the respective coupling members are coupled to each other with an axial member inserted into an insertion hole formed in at least one of the link and the respective coupling members, wherein the insertion hole is formed in at least one of a coupling portion of the link and the seat and a coupling portion of the link and the floor, and is formed in a shape that inhibits the axial member from undergoing positional displacement in the front-rear direction within the insertion hole when the seat is at the in-use position and allows the axial member to undergo positional displacement in the front-rear direction within the insertion hole as the seat is moved from the in-use position to the stored position, and wherein:

the link coupled so as to undergo positional displacement is formed of an upper link member coupled to a seat side and a lower link member coupled to a floor side;

each of the upper link member and the lower link member is provided with a fixing hole;

the upper link member and the lower link member are fixed to each other by a fixing member inserted into both fixing holes while the fixing holes superimpose each other; and at least one of the fixing hole in the upper link member and the fixing hole in the lower link member is shaped as a long hole having a length dimension in a link longitudinal direction larger than a diameter of the fixing member.

* * * * *